United States Patent

Kuske et al.

[11] Patent Number: 5,907,979
[45] Date of Patent: Jun. 1, 1999

[54] FLYWHEEL FOR INTERNAL COMBUSTION ENGINES

[75] Inventors: Andreas Kuske, Maastricht, Netherlands; Matthias Kastenholz, Cologne, Germany

[73] Assignee: Ford Global Technologies, Inc., Dearborn, Mich.

[21] Appl. No.: 08/934,931

[22] Filed: Sep. 22, 1997

[30] Foreign Application Priority Data

Sep. 21, 1996 [DE] Germany ............................ 196 38 843

[51] Int. Cl.⁶ ........................................................ G05G 1/00
[52] U.S. Cl. ................................................................ 74/572
[58] Field of Search .................................................. 74/572

[56] References Cited

U.S. PATENT DOCUMENTS

| | | | |
|---|---|---|---|
| 3,462,136 | 8/1969 | Rumsey | 74/572 X |
| 4,473,329 | 9/1984 | Aoshima et al. | 408/11 |
| 5,191,809 | 3/1993 | Craig | 74/572 |
| 5,197,352 | 3/1993 | Haikawa | 74/572 X |
| 5,203,227 | 4/1993 | Li | 74/572 |
| 5,582,076 | 12/1996 | Hamada | 74/572 X |

FOREIGN PATENT DOCUMENTS

| | | |
|---|---|---|
| 0 834 675 A2 | 4/1998 | European Pat. Off. . |
| 196 38 843 C1 | 1/1998 | Germany . |

*Primary Examiner*—Rodney H. Bonck
*Assistant Examiner*—Ha Ho
*Attorney, Agent, or Firm*—Neil P. Ferraro

[57] ABSTRACT

In a flywheel (1) for an internal combustion engine which is provided on a side face with bore holes (4, 6) with bridges (7) between them and a sensor located above them to determine the position of the flywheel, and thus of the crankshaft, to avoid siren-like whistling noises from the flywheel an annular groove (5) is formed in such a way that it intersects the bore holes (4, 6) so that there is a connection between the bore holes (4, 6) and the groove (5).

2 Claims, 2 Drawing Sheets

FLYWHEEL FOR INTERNAL COMBUSTION ENGINES

FIELD OF THE INVENTION

The invention relates to a flywheel for an internal combustion engine which is provided with bore holes distributed on a side face and at the circumference of the flywheel, the path followed by which as the flywheel rotates lies in the vicinity of a sensor so that the rotary position and the rotation of the flywheel can be detected by the sensor.

BACKGROUND OF THE INVENTION AND PRIOR ART

The purpose of the bore holes is to produce uniform bridges between the bore holes. These are counted by a sensor and converted into data about the angular position of the flywheel, and hence of the crankshaft. For this it is of course necessary for the angular position of the flywheel relative to the crankshaft to be definitely fixed.

Flywheels of this kind are in use in large numbers, but have the disadvantage that as a result of the arrangement of bore holes at the circumference of the disk and the material remaining between the bore holes, also in cooperation with the sensor, noises which are characterised as a siren-effect occur, mostly within specific engine speed ranges, dependent on the particular design. Such noises are very annoying and can impair the comfort of occupants of the vehicle when an internal combustion engine with such a flywheel is used.

Means for damping this phenomenon are costly, and moreover do not have the desired technical effect.

OBJECT OF THE INVENTION

Accordingly it is the object of the invention to provide a flywheel wherein such noises can be substantially reduced or completely eliminated, particularly within specified engine speed ranges.

SUMMARY OF THE INVENTION

To achieve this object an annular groove is arranged on the side face of the flywheel in such a way that the annular groove at least partially intersects the bore holes. By this means the annoying whistling noise is substantially reduced or even completely eliminated.

In an embodiment of the invention the annular groove has a rectangular cross-section. This makes for particularly simple manufacturing processes.

BRIEF DESCRIPTION OF THE DRAWINGS

An exemplary embodiment of the invention is shown in the drawings, in which.

DETAILED DESCRIPTION OF A PREFERRED EMBODIMENT OF THE INVENTION

Figure 1:
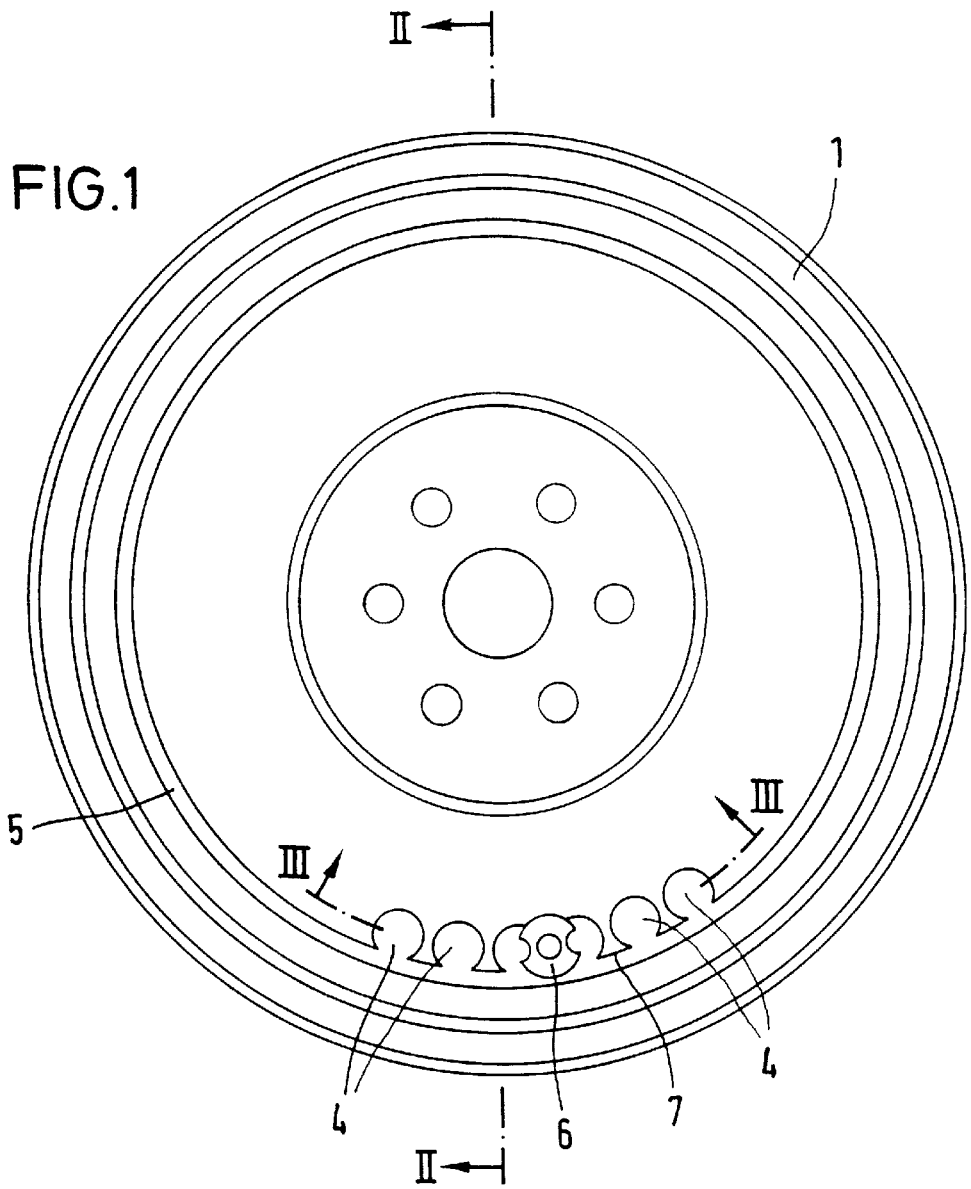
FIG. 1 is a plan view from above of the flywheel in accordance with the invention.
Figure 3:
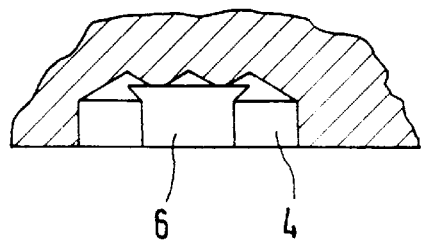
FIG. 3 is a detail of the arrangement shown in FIG. 1 along the line III—III shown in cross-section.

A flywheel 1 has on a side face 3 a plurality of bore holes 4 which are distributed uniformly at the circumference. Respective bridges 7 remain between the bore holes. At one position the bridge 7 located between two bore holes is removed by the provision of a reference bore hole 6. The angular position of the flywheel, and thus also of the crankshaft, relative to the other units of the internal combustion engine is thereby defined. From this the data such as the ignition point, etc, required for the operation of the internal combustion engine can then be determined and controlled.

Figure 2:
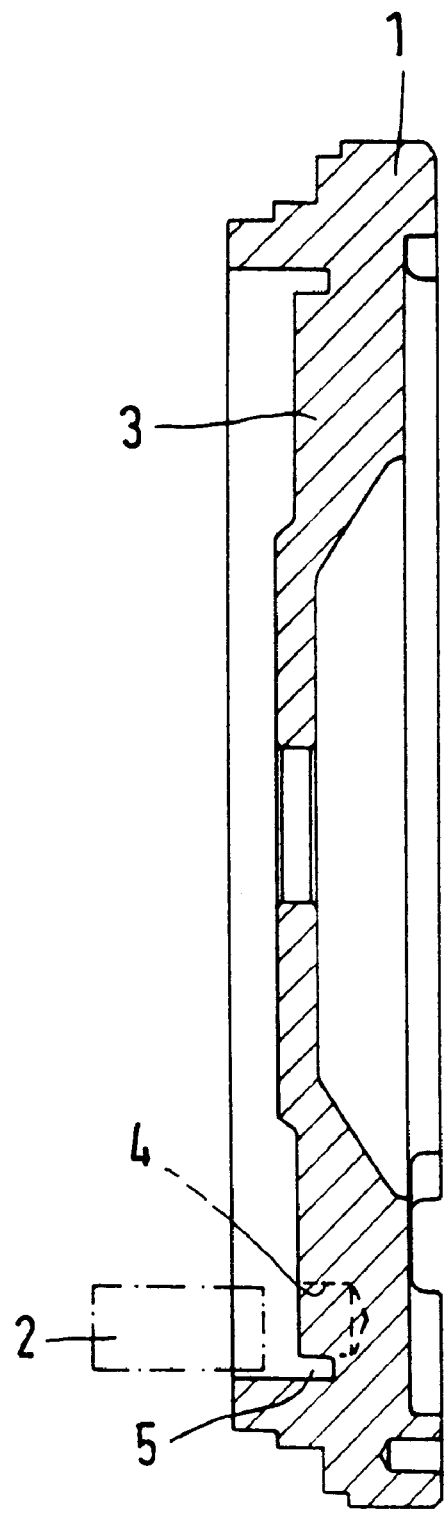
FIG. 2 is a section along the line II—II of the flywheel shown in FIG. 1.

Above the bore holes 4 and the reference bore hole 6 there is a sensor 2: this is shown diagrammatically in FIG. 2 and as a rule is secured to other parts of the internal combustion engine.

On the side face 3 an annular groove 5 is provided which runs relative to the bore holes 4 and to the reference bore hole 6 so as to intersect these bore holes. It is particularly important for there to be a direct connection between the bore holes 4 and 6 and the annular groove 5.

The cross-sectional shape of the annular groove is rectangular, though it can have a different shape, for example trapezoidal.

What is claimed is:

1. A flywheel for an internal combustion engine, comprising:

the flywheel having a circumference and a plurality of circumferentially spaced bore holes distributed on a side face and at the circumference thereof;

a plurality of bridges provided between each adjoining hole of the plurality of bore holes;

a reference bore hole to determine a position of the flywheel, comprising a first adjacent pair of the plurality of bore holes having the bridge therebetween removed, and the bore holes and the reference bore hole being arranged so that a path followed by the bore holes and reference bore hole is positioned adjacent a sensor which detects an angular position and rotation of the flywheel and a crankshaft of the engine; and the flywheel further comprising an annular groove formed in the side face thereof, the annular groove intersecting the bore holes and the reference bore hole, thereby connecting the bore holes, reference bore hole, and the groove.

2. A flywheel according to claim 1, wherein the annular groove has a substantially rectangular cross section.

* * * * *